(12) United States Patent
Rahat et al.

(10) Patent No.: US 10,069,776 B1
(45) Date of Patent: Sep. 4, 2018

(54) NETWORK BASED PERSONAL NUMBER BLOCKING

(71) Applicant: T-Mobile USA, Inc., Bellevue, WA (US)

(72) Inventors: Adnan Rahat, Newcastle, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/711,187

(22) Filed: Sep. 21, 2017

(51) Int. Cl.
| | |
|---|---|
| *H04W 72/00* | (2009.01) |
| *H04L 12/58* | (2006.01) |
| *H04M 3/42* | (2006.01) |
| *H04L 29/08* | (2006.01) |

(52) U.S. Cl.
CPC ............ *H04L 51/12* (2013.01); *H04L 67/306* (2013.01); *H04M 3/42059* (2013.01)

(58) Field of Classification Search
CPC ..... H04L 67/02; H04L 51/046; H04L 63/302; H04W 12/02; H04W 4/18; G06Q 50/265; H04M 3/493; H04M 3/4878
See application file for complete search history.

(56) References Cited

U.S. PATENT DOCUMENTS

| | | | | |
|---|---|---|---|---|
| 6,131,121 A | * | 10/2000 | Mattaway | H04L 1/0083 709/227 |
| 8,094,800 B1 | * | 1/2012 | Smith | H04M 3/436 379/210.02 |
| 2011/0134804 A1 | * | 6/2011 | Maes | H04M 7/0012 370/259 |
| 2015/0121373 A1 | * | 4/2015 | Black | G06F 9/45533 718/1 |
| 2017/0171385 A1 | * | 6/2017 | Koch | H04M 3/42068 |
| 2017/0223186 A1 | * | 8/2017 | Brackett | H04M 3/42051 |

* cited by examiner

*Primary Examiner* — Khalid Shaheed
(74) *Attorney, Agent, or Firm* — Lee & Hayes, PLLC

(57) ABSTRACT

Systems, devices, and techniques described herein are directed to network based personal number blocking. In particular, the systems, devices, and techniques can be implemented in networks including user equipment (UE) associated with native numbers and alias numbers, and can include blocking native numbers or alias numbers. Further, users can access a user profile or an application via a UE to assign personal number blocking (PNB) preferences to the various native numbers and alias numbers. Indications of such PNB can be transmitted from a UE to a network device to update a user profile in a central repository or database. If a user activates another UE or otherwise associates additional native numbers or alias numbers, the PNB can be seamlessly applied to the new device or numbers.

17 Claims, 8 Drawing Sheets

US 10,069,776 B1

NETWORK BASED PERSONAL NUMBER BLOCKING

BACKGROUND

Modern phones provide myriad conveniences but provide many opportunities for unwanted or unsolicited communications. For example, telemarketers and robocalls can originate unwanted calls. Call blocking, call screening, or call rejection have been used to block incoming calls from specific telephone numbers. For example, some prior art call blocking techniques have included external call blockers that plug into existing phones allowing user to send a message to such unwanted callers. Other prior art techniques have implemented call blocking by storing blocked numbers in a SIM (subscriber identity module) installed in a phone. However, when a user changes phones, the call blocking may not transfer to any such new devices. Further, it can be cumbersome to track and block numbers individually to cover all cases of unwanted numbers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
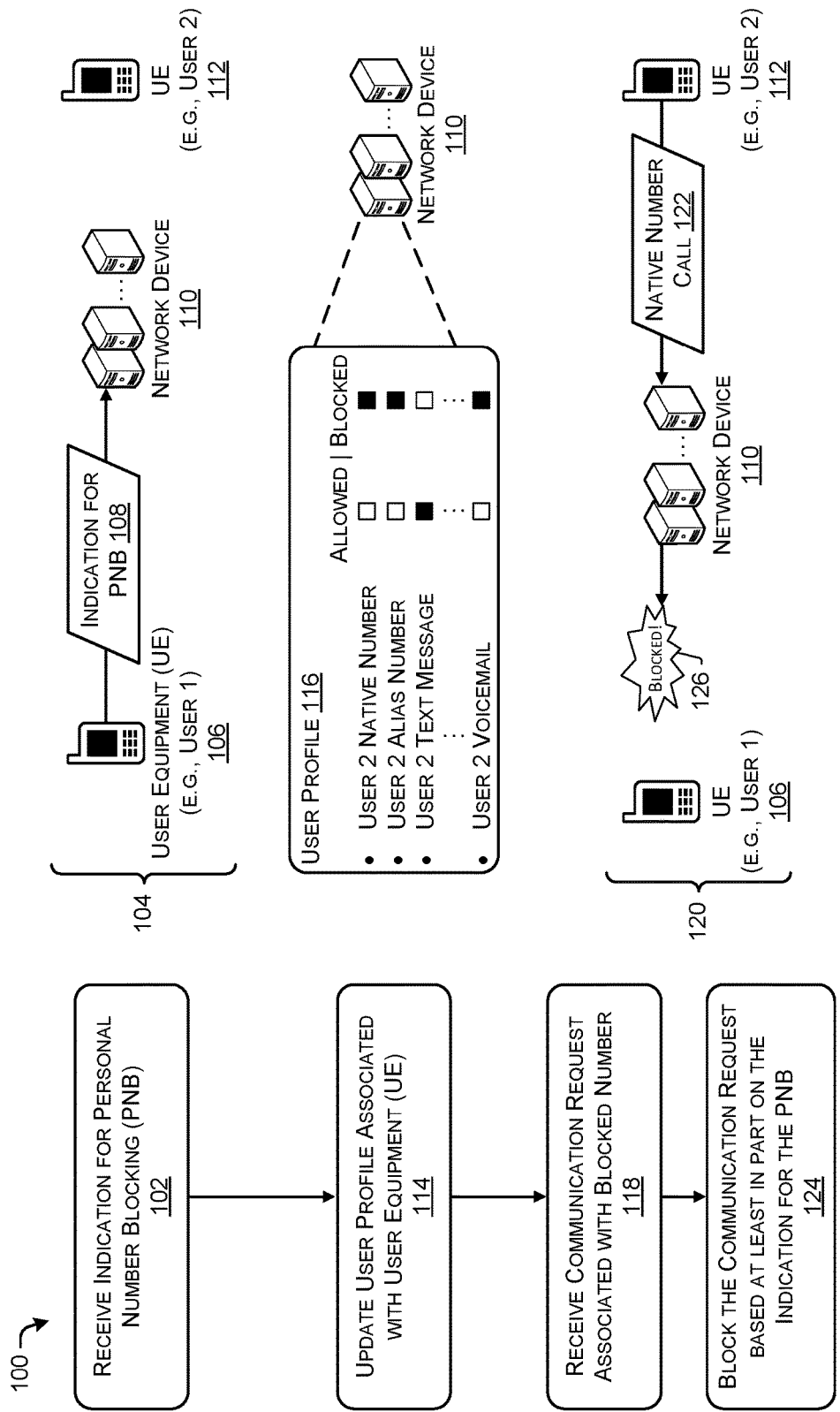
FIG. 1 illustrates a pictorial flow diagram of a process for implementing the network based personal number blocking, as described herein.

The systems, devices, and techniques described herein are directed to network based personal number blocking. In particular, the systems, devices, and techniques can be implemented in networks including user equipment (UE) associated with native numbers and alias number(s), and can include blocking one or more native number(s) or alias number(s). Further, users can access a user profile and/or an application via a UE to assign personal number blocking (PNB) to the various native number(s) and/or alias number(s). Indications of such PNB can be transmitted from a UE to a network device to update a user profile in a central repository or database. If a user activates another UE or otherwise associates additional native number(s) and/or alias number(s), the PNB can be seamlessly applied to the new device or numbers.

As mentioned above, the personal number blocking can be implemented based at least in part on associations between native numbers and alias numbers. As used herein, a "native number" (or "native phone number") is an E.164 address or identity assigned (such as an International Mobile Subscriber Identity (IMSI), or a Mobile Station International Subscriber Directory Number, MSISDN) to a user equipment by a wireless service provider or network provider. For example, when a user acquires a user equipment, such as a wireless phone, a wireless service provider or network provider can assign an IMSI and/or an E.164 address (e.g., up to a fifteen-digit telephone number) that is specific for the user associated with the user equipment.

User equipment can be further associated with one or more additional alias numbers (also referred to as "alias phone numbers") that can be activated or installed at various user equipment, computing devices, and/or computing appliances. For example, a first UE can be associated with a first native number and various alias numbers (e.g., Alias #1, Alias #2, Alias #3, etc.), while a second UE can be associated with a second native number and various alias numbers (e.g., Alias #1, Alias #2, Alias #4, etc.). Thus, the first UE and the second UE represent the multiple device and multiple line functionality described herein, whereby a single number can be associated with multiple devices, and whereby a single device can be associated with multiple lines. Further, computing appliances can be configured with client applications supporting one or more alias numbers (e.g., Alias #1, Alias #2, Alias #3, Alias #4, etc.).

In one example, a user of a first UE can block some or all of the numbers associated with a second UE. The first UE can receive an indication (e.g., via a user interface) of a native number or an alias number to be blocked. The first UE can transmit the indication to a network device, which can associate the PNB indication with other native number(s) and/or alias number(s) associated with the number to be blocked. That is, if the user blocks a native number associated with the second UE, the network device can update a user profile associated with the first UE to block all alias number(s) associated with the native number.

In some instances, the network based personal number blocking can prevent any communication requests from reaching a UE. For example, if a second UE associated with a native number calls a first UE, the network device can determine that the native number is blocked from reaching the first UE. The network device can provide a variety of responses to a blocked number. For example, the network device can provide a message to the second UE indicating that the first UE has blocked the second user equipment; the network device can accept a message (e.g., a voicemail, SMS/MMS message, email, etc.) from the second UE and store the message on the network device in event the first UE wishes to review the message; the network device can simply provide a ringtone to the second UE without providing any signaling to the first UE.

In some instances, the PNB can be extended to blocking groups of native numbers, alias numbers, etc. For example, a user can navigate through contacts or a user profile associated with a UE to select a plurality of user profiles (e.g., specific users), and/or one or more of native number(s) and/or alias number(s). The user can group user profiles and/or native/alias numbers to form a group, and can apply the PNB to a particular group.

Further, the PNB can be based on schedules. For example, a user can select dates and/or times for which blocking can be applied (or not applied). For example, the PNB can be applied based on days of the week, time of the day etc.

In some instances, the PNB can be based on communication types. For example, in some instances, users can block a first type of communication from a number, while allowing a second type of communication from the number. By way of example, the PNB can be specified to block text messages from the number, but can allow voice calls from the number. Types of communication can include, but are not limited to, one or more of: voice calls; video calls; SMS/MMS messages; emails; voicemails; and the like.

As mentioned above, the network based personal number blocking can seamlessly extend the personal number blocking as a user adds devices or numbers to the network. For example, a user equipment can be associated with a native number and/or one or more alias number(s). The user can activate an alias number of the one or more alias numbers on any computing device, which can import the PNB attributes, as discussed herein. Further, if a user replaces an old smartphone with a new smartphone, for example, the network based personal number blocking can be seamlessly applied to the new smartphone, without any unwanted communications reaching the new smartphone because of a gap in service.

The systems, devices, and techniques described herein can improve a functioning of a network by reducing network congestion. Further, the systems, devices, and techniques can improve a user experience by reducing a number of unwanted communications. With respect to reducing network congestion, implementing the personal number blocking on a network device allows the network device to intercept the blocked communication (e.g., voice call, video call, SMS/MMS, etc.) and to prevent the communication from reaching a destination, thereby reducing signaling and congestion associated with such signaling. With respect to the user experience, it may be understood that reducing or preventing telemarketers and/or robocallers can reduce annoyance or frustration associated with unwanted calls.

In some instances, the systems, devices, and techniques described herein can improve network security by reducing or removing opportunities for telemarketers or robocallers to contact potential customers. Further, known bad actors can be prevented from contacting some or all user equipment associated with a network, which can improve overall network security.

As discussed above, the network based personal number blocking can improve a functioning of the network by reducing congestion by reducing signaling to a user equipment. The network based PNB can further improve a functioning of the UE by improving battery life, for example, by reducing signaling to the UE for communications that the user does not wish to receive. Thus, by blocking certain communications a UE can improve a battery life, as a UE in standby mode can use significantly less power than a UE engaged in active signaling, even if the communication is brief or denied altogether. These and other improvements to the functioning of a computer and network are discussed herein.

The systems, devices, and techniques described herein can be implemented in a number of ways. Example implementations are provided below with reference to the following figures.

FIG. 1 illustrates a pictorial flow diagram 100 of a process for implementing the network based personal number blocking, as described herein.

At 102, the process can include receiving an indication for personal number blocking (PNB). As illustrated in an example 104, a user equipment (UE) 106 can transmit an indication for PNB 108 (also referred to as a PNB indication 108) to be received by a network device 110. In general, the UE 106 can receive, via a user interface operating on the UE 106, one or more selections of one or more user profiles, native numbers, and/or alias numbers to be blocked. In some instances, one or more of the user profiles, native numbers, and/or alias numbers to be blocked can correspond to a UE 112, corresponding to a User 2.

For convenience, a UE to be blocked can be referred to as a "blocked UE," a "blocked originating UE," etc. For comparison, in some instances, the UE that is blocking various user profiles, native numbers, or alias numbers can be referred to as a "blocking UE," a "blocking terminating UE," etc. Further, native numbers or alias number to be blocked can be referred to as "blocked native number(s)" or "blocked alias number(s)."

In some instances, the network device 110 can be implemented as a Web Service Gateway (WSG) in a second generation, third generation, fourth generation, or fifth generation mobile network. In some instances, the PNB indication 108 can be received via a control plane associated with the network device 110.

At 114, the process can include updating a user profile associated with user equipment. For example, the operation 114 can include updating a user profile associated with the UE 106 based at least in part on the PNB indication 108. By way of example, a user profile 116 illustrates preferences, settings, instructions, and/or selections associated with various aspects of "User 2," which corresponds to a user to be blocked (e.g., the UE 112). For example, the user profile 116 can store PNB indications corresponding to one or more of: user 2 native number (e.g., indicated as "blocked" in the user profile 116); user 2 alias number (e.g., indicated as "blocked" in the user profile 116); user 2 text message (e.g., indicated as "allowed" in the user profile 116); and user 2 voicemail (e.g., indicated as "blocked" in the user profile 116), and the like. That is, the network device 110 can store the user profile 116 including indications of preferences of the blocking UE (e.g., the UE 106) with respect to various features or communication types of the blocked UE (e.g., the UE 112).

In some instances, the user profile 116 can store PNB preferences for a plurality of blocked UEs, and is not limited to a single UE or communication type. In some instances, the network device 110 can include personal number blocking preferences for some or all of the contacts (e.g., addresses) associated with the UE 106.

At 118, the process can include receiving a communication request associated with a blocked number. As illustrated in an example 120, the UE 112 can transmit a communication request for a native number call 122 to the network device 110. As can be understood, the communication request is not limited to the native number call 122, and can include a variety of communications.

At 124, the network device 110 can block the communication request based at least in part on the indication for the PNB. In the example 120, the network device 110 is illustrated as blocking the communication request (e.g., the native number call 122) at element 126, such that the blocking UE (e.g., the UE 106) does not receive the call or any indication or signaling corresponding to the communication request. Thus, the network device 110 can completely handle the call blocking without interrupting the UE 106.

In some instances, the operation 124 can include parsing the communication request (e.g., the native number call 122) to determine that the UE 112 is the originating UE and the UE 106 is the terminating UE. Further, the operation 124 can include determining that the UE 112 is a blocked UE with respect to native number for the blocking UE 106. As discussed above, the user 2 native number is indicated as "blocked" in the user profile 116.

In general, the UEs 106 or 112 can be implemented as any suitable type of computing device configured to communicate over a wired or wireless network, including, without limitation, a mobile phone (e.g., a smart phone), a tablet computer, a laptop computer, a desktop computer (e.g., coupled to a network via wires or wirelessly), a telephone (e.g., a voice-over internet protocol (VOIP) phone, a wired telephone, etc.), a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

In accordance with various embodiments described herein, the terms "user equipment (UE)," "wireless communication device," "wireless device," "communication device," "mobile device," and "client device," can be used interchangeably herein to describe any UE (e.g., the UEs 106 or 112) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, a user can further utilize the UEs 106 or 112 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the $3^{rd}$ Generation Partnership Project (3GPP) for delivering Internet Protocol (IP) multimedia to a UE, such as the UEs 106 or 112. The IMS core can be maintained and/or operated by one or more service providers, such as one or more wireless carriers ("carriers"), that provide IMS-based services to users who are associated with UEs, such as the UEs 106 or 112. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be include in the IMS network. The network device 110 can represent an IMS node in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

Further, the UEs 106 or 112 are configured to utilize various radio access networks (RANs) in order to access the IMS core. In general, the IMS core is agnostic to the access technology that is used to connect a UE to the IMS core. In this manner, the UEs 106 or 112 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UEs 106 or 112 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage. Additional details of an example network and aspects of the network based personal number blocking are discussed below in connection with FIGS. 2-4, and throughout this disclosure.

Figure 2:
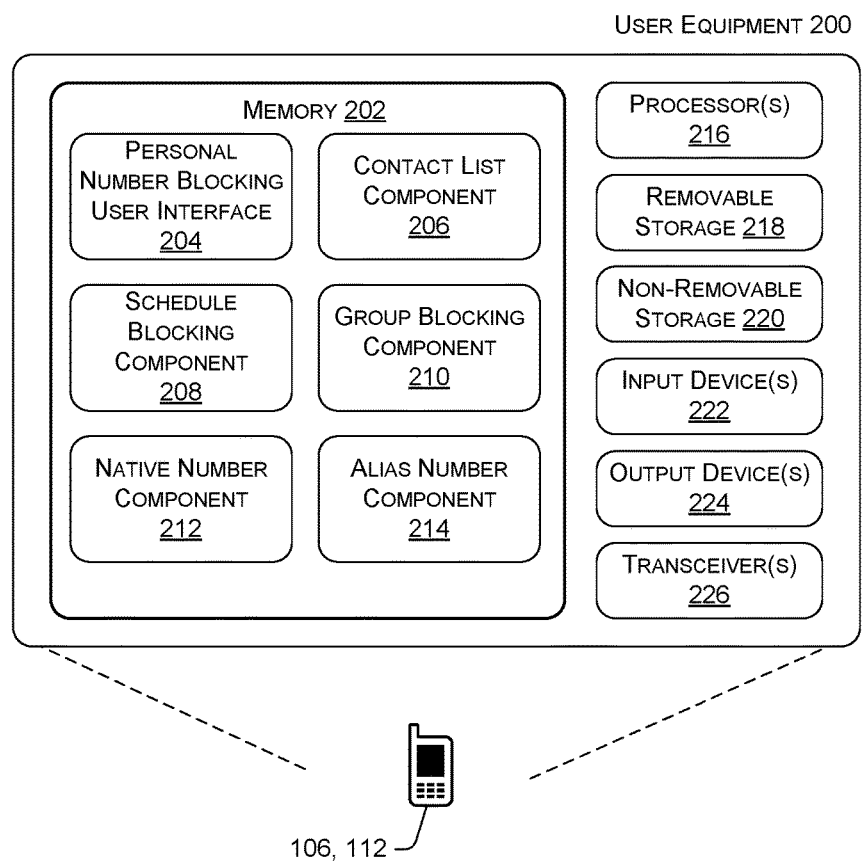
FIG. 2 illustrates an example user equipment for implementing and interfacing with the network based personal number blocking, as described herein.

FIG. 2 illustrates an example user equipment 200 for implementing and/or utilizing the network based personal number blocking, as described herein. In some embodiments, the user equipment (UE) 200 can correspond to the UE 106 or 112 FIG. 1. It is to be understood in the context of this disclosure that the user equipment 200 can be implemented as a single device or as a plurality of devices with components and data distributed among them.

As illustrated, the user equipment 200 comprises a memory 202 storing a personal number blocking user interface 204, a contact list component 206, a schedule blocking component 208, a group blocking component 210, a native number component 212, and an alias number component 214. Also, the user equipment 200 includes processor(s) 216, a removable storage 218 and non-removable storage 220, input device(s) 222, output device(s) 224, and transceiver(s) 226. In some embodiments, the user equipment 200 can include a microphone, a camera, a GPS, an electronic compass, a heat sensor, biometric sensors, chemical sensors, accelerometer(s), gyroscope(s), pressure sensor(s), photometers, and the like.

In various embodiments, memory 202 is volatile (such as RAM), non-volatile (such as ROM, flash memory, etc.) or some combination of the two. The personal number blocking user interface 204, the contact list component 206, the schedule blocking component 208, the group blocking component 210, the native number component 212, and the alias number component 214 stored in the memory 202 can comprise methods, threads, processes, applications or any other sort of executable instructions. The personal number blocking user interface 204, the contact list component 206, the schedule blocking component 208, the group blocking component 210, the native number component 212, and the alias number component 214 can also include files and databases.

The personal number blocking user interface 204 can include functionality to access files or databases associated with the UE 200 and to present one or more user interfaces to receive indications of personal number blocking, as discussed herein. Further, the personal number blocking (PNB) user interface (UI) 204 can include functionality to transmit one or more PNB indications (e.g., the PNB indication 108) to a network device (e.g., the network device 110) to update a user profile associated with the UE 200 stored on or in connection with the network device 110. In some instances, the PNB UI 204 can access a user profile stored on the UE 200 or the network device 110 to present individual contacts to a user of the UE 200. For example, the PNB UI 204 can access the contact list component 206 to determine various communication types to allow or block, as discussed herein. Further, the PNB UI 204 allows a user to determine one or more groups or schedules for the PNB, as discussed herein. Further, in some instances, the PNB UI 204 can update a call log to reflect the PNB indications, as discussed herein.

The contact list component 206 can include functionality to access contacts stored in the UE 200 or on the network device 110. For example, the contact list component 206 can store names, addresses, numbers (e.g., native numbers, alias numbers, etc.) associated with various contacts. In some instances, the contact list component 206 can add, edit, and/or delete contacts on the UE 200, which can be synchronized with a contact list or user profile stored remotely, such as on the network device. In some instances, the contact list component 206 can operate in conjunction with the PNB UI 204 to set preferences with respect to allowing/blocking communications from particular numbers or with respect to particular types of communications.

The schedule blocking component 208 can include functionality to initiate, terminate, set, select, or otherwise determine a schedule for the personal number blocking, as discussed herein. For example, the schedule blocking component 208 can operate in conjunction with the PNB UI 204 to receive user input to set times, dates, locations, etc. associated with such personal number blocking. For example, the schedule blocking component 208 can receive a selection that a particular native number associated with a blocked UE is to be blocked during a particular time period (or is to be blocked for all times except for a particular time period). In some instances, the schedule blocking component 208 can be based at least in part on an indication of a location of the UE 200. For example, the schedule blocking component 208 can receive an indication of a geolocation or geofence indicating locations where blocking is or isn't to be applied. Further, the schedule blocking component 208 can base call blocking on a status of a user determined in connection with a calendar application. For example, PNB can be activated when a user is in a meeting or on vacation (e.g., as indicated on a calendar).

The group blocking component 210 can include functionality to group one or more numbers (e.g., native number(s) and/or alias number(s)) associated with one or more users (or user profiles) to implement the PNB, as discussed herein. For example, the group blocking component 210 can allow, via the PNB UI 204, a selection of a plurality of contacts or communication types to determine groups to be blocked. Further, groups can be stored and uniquely named so that schedule based blocking can be applied to the group, as discussed herein. In some instances, the group blocking component 210 can automatically determine groups based on associations between native number(s) and alias number(s). For example, a user can select a native number to be blocked and can request all associated numbers to be grouped with the native number. In this manner, native number(s) and/or alias number(s) can be grouped together to provide a robust technique for blocking communications associated with a particular user or user profile. In some instances, as discussed herein, as additional alias number(s) are added to a blocked profile, the group blocking component 210 can update the group to include the additional alias number(s).

The native number component 212 can include functionality to store a native number associated with the UE 200, and to initiate and/or receive a communication via a dialer component. In some embodiments, the native number corresponds to an E.164 address or identity assigned (such as an IMSI) to the computing device by a network device. For example, the naive number can correspond to a phone number such as "555-111-2222". In some embodiments, the native number component 212 can include an application that enables calls to be originated via Voice over Internet Protocol (VoIP), circuit switched voice, or some other protocol, using Session Initiation Protocol (SIP) signaling.

The alias number component 214 can include functionality to initiate or terminate calls for other phone numbers in addition to the native number component 212. In some embodiments, the alias number component 214 can include phone numbers or other identifiers allocated by a network device (e.g., the network device 110) for use in connection with the native number(s). However, in some embodiments, the alias number component 214 is not associated with any computing devices (e.g., via a Subscriber Identity Module, SIM card, or via a Removable User Identity Module, R-UIM, etc.) or computing appliances until a particular alias number is activated for use at the computing device or computing appliance. Thus, a user can use the alias number component 214 to activate an alias number at a computing device (e.g., as discussed in connection with FIG. 4), for example, and the alias number component 214 can be used to initiate calls and transfer calls to and from the various alias numbers. Further, the alias number component 214 or another application or interface provided by the UE 200 can permit the user to select, enter, or view the alias numbers, or to add descriptions for the alias numbers, such as "personal," "work," "school," "refrigerator," "television," "smart mirror," etc.

In some embodiments, the processor(s) 216 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and nonvolatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

The user equipment 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the user equipment 200 also includes one or more wired or wireless transceiver(s) 226. For example, the transceiver(s) 226 can include a network interface card (NIC), a network adapter, a LAN adapter, or a physical, virtual, or logical address to connect to various network(s), or to the network device 110, for example. To increase throughput when exchanging wireless data, the transceivers 226 can utilize multiple-input/multiple-output (MIMO) technology. The transceiver(s) 226 can comprise any sort of wireless transceivers capable of engaging in wireless, radio frequency (RF) communication. The transceivers 226 can also include other wireless modems, such as a modem for engaging in Wi-Fi, WiMax, Bluetooth, or infrared communication.

Figure 3:
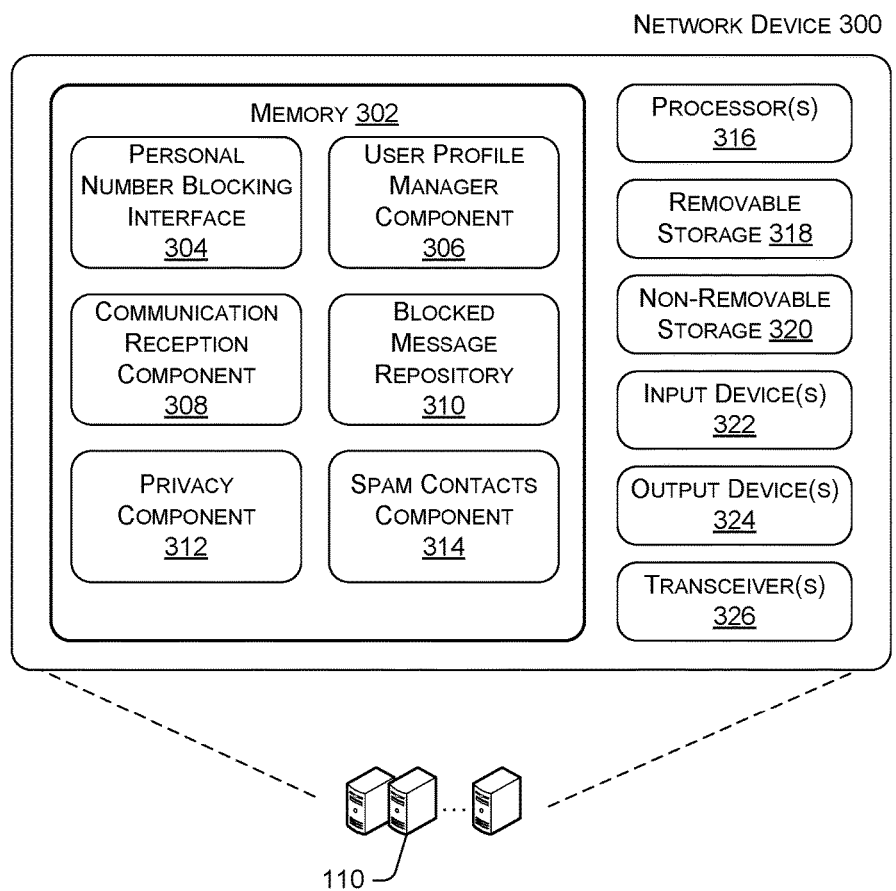
FIG. 3 illustrates an example network device for implementing the network based personal number blocking, as described herein.

FIG. 3 illustrates an example network device 300 for implementing the network based personal number blocking, as described herein. In some embodiments, the network device 300 can correspond to the network device 110 of FIG. 1. It is to be understood in the context of this disclosure that the network device 300 can be implemented as a single device or as a plurality of devices with components and data distributed among them.

As illustrated, the network device 300 comprises a memory 302 storing a personal number blocking interface 304, a user profile manager component 306, a communication reception component 308, a blocked message repository 310, a privacy component 312, and a spam contacts component 314. Also, the network device 300 includes processor(s) 316, a removable storage 318 and non-removable storage 320, input device(s) 322, output device(s) 324, and transceiver(s) 326.

In various embodiments, memory 302 is volatile (such as RAM), non-volatile (such as ROM, flash memory, etc.) or some combination of the two. The personal number blocking interface 304, the user profile manager component 306, the communication reception component 308, the blocked message repository 310, the privacy component 312, and the spam contacts component 314 stored in the memory 302 can comprise methods, threads, processes, applications or any other sort of executable instructions. The personal number blocking interface 304, the user profile manager component 306, the communication reception component 308, the blocked message repository 310, the privacy component 312, and the spam contacts component 314 can also include files and databases.

The personal number blocking interface 304 can include functionality to receive indications of personal number blocking from various user equipment (e.g., the UE 106). In some instances, the PNB interface 304 can provide a user interface for users to access the PNB functionality via a computing device (e.g., using a web browser) when a user is away from an associated user equipment. Thus, the PNB interface 304 can provide a portal to access PNB information, update contacts, provide PNB indications, add/modify/delete groups, edit scheduling, and the like.

The user profile manager component 306 can include functionality to store and/or manage user profiles and associated personal number blocking preferences associated with various numbers and communication types. For example, the user profile manager component 306 can store a user profile (e.g., the user profile 116) associated with a first user or user equipment (e.g., the UE 106) and can store a corresponding user profile associated with a second user or user equipment (e.g., the UE 112). In some instances, the user profile manager component 306 can store a table or database including associations between native number(s) and alias number(s), as discussed herein. In some instances, as a user profile is changed via a user equipment (e.g., by adding contacts to user equipment) the user profile manager component 306 can synchronize user profiles stored on the user equipment 200 and/or the network device 300. In some instances, the user profile manager component 306 can resolve conflicting information in favor of the network device 300 (e.g., the network device maintains a master copy of the user profile) and in some instances, the user profile manager component 306 can resolve conflicting information in favor of the user equipment 200.

The communication reception component 308 can include functionality to receive communication request(s) from various user equipment and/or computing devices in a network and to apply the personal number blocking discussed herein. For example, the communication reception component 308 can receive a communication request and can determine an originating device and a terminating device associated with the communication. Further, the communication reception component 308 can determine if a native number, alias number, user profile, etc. associated with the communication request is a blocked UE, blocked user profile, or a blocked communication type associated with the terminating device. In such a case, the communication reception component 308 can prevent further signaling from being transmitted to the terminating device, as discussed herein.

The blocked message repository 310 can include functionality to receive messages from blocked UEs/number/user profiles and store the messages on the network device 300. In some instances, a user can access the blocked message repository 310 to determine if any messages are available. In some instances, the blocked message repository 310 can store a log of blocked communications that a blocking UE can access. In some instances, if a user unblocks a particular UE/number/user profile, the user can provide an indication to the blocked message repository 310 to provide stored messages to the UE 200, for example.

The privacy component 312 can include functionality to maintain privacy of blocked user and/or blocking users. For example, in some instances, a blocking user who knows a native number associated with a user to be blocked may wish to block additional alias number(s) associated with the native number. However, the blocking user may not know such additional alias number(s). In such a case, the privacy component 312 can receive a PNB indication based on the native number and can associate the PNB number with the additional alias number(s) without revealing the alias number(s) to the blocking number. In another example, the privacy component 312 can password protect or encrypt PNB indications in a user profile accessible by multiple members (e.g., of a family). For example, the privacy component 312 can allow a first user to password protect a list of blocked numbers so that other users associated with the user profile cannot access the list of blocked number. In some instances, the privacy component 312 can refrain from informing a blocked number (or UE, user profile, etc.) that the number has been blocked, to protect a privacy of the blocking user.

The spam contacts component 314 can include functionality to store a list of contacts associated with spam (e.g., unwanted phone calls or communications, etc.) and to block such originating devices automatically upon receiving an indication from a blocking UE. For example, the spam contacts component 314 can accumulate reports that a native number or alias number is associated with a spammer (e.g., telemarketer, robocaller, phisher, etc.) The spam contacts component 314 can further determine a confidence level associated with various number indicating a likelihood that the number is associated with a spam contact. Based at least in part on a confidence level associated with a number being above a threshold level, the spam contacts component 314 can block communications from such blocked spam contacts for blocking devices that have enable such spam blocking.

In some embodiments, the processor(s) 316 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer readable instructions, data structures, program modules, or other data. Memory 302, removable storage 318 and non-removable storage 320 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 300. Any such tangible computer-readable media can be part of the network device 300.

The network device 300 can include input device(s) 322, such as a keypad, a cursor control, a touch-sensitive display, etc. Also, the network device 300 can include output device(s) 324, such as a display, speakers, etc. These devices are well known in the art and need not be discussed at length here.

As illustrated in FIG. 3, the network device 300 can include one or more wired or wireless transceiver(s) 326. In some wireless embodiments, to increase throughput, the transceiver(s) 326 can utilize multiple-input/multiple-output (MIMO) technology. The transceiver(s) 326 can be any sort of wireless transceivers capable of engaging in wireless, radio frequency (RF) communication. The transceiver(s) 326 can also include other wireless modems, such as a modem for engaging in Wi-Fi, WiMax, Bluetooth, or infrared communication.

Figure 4:
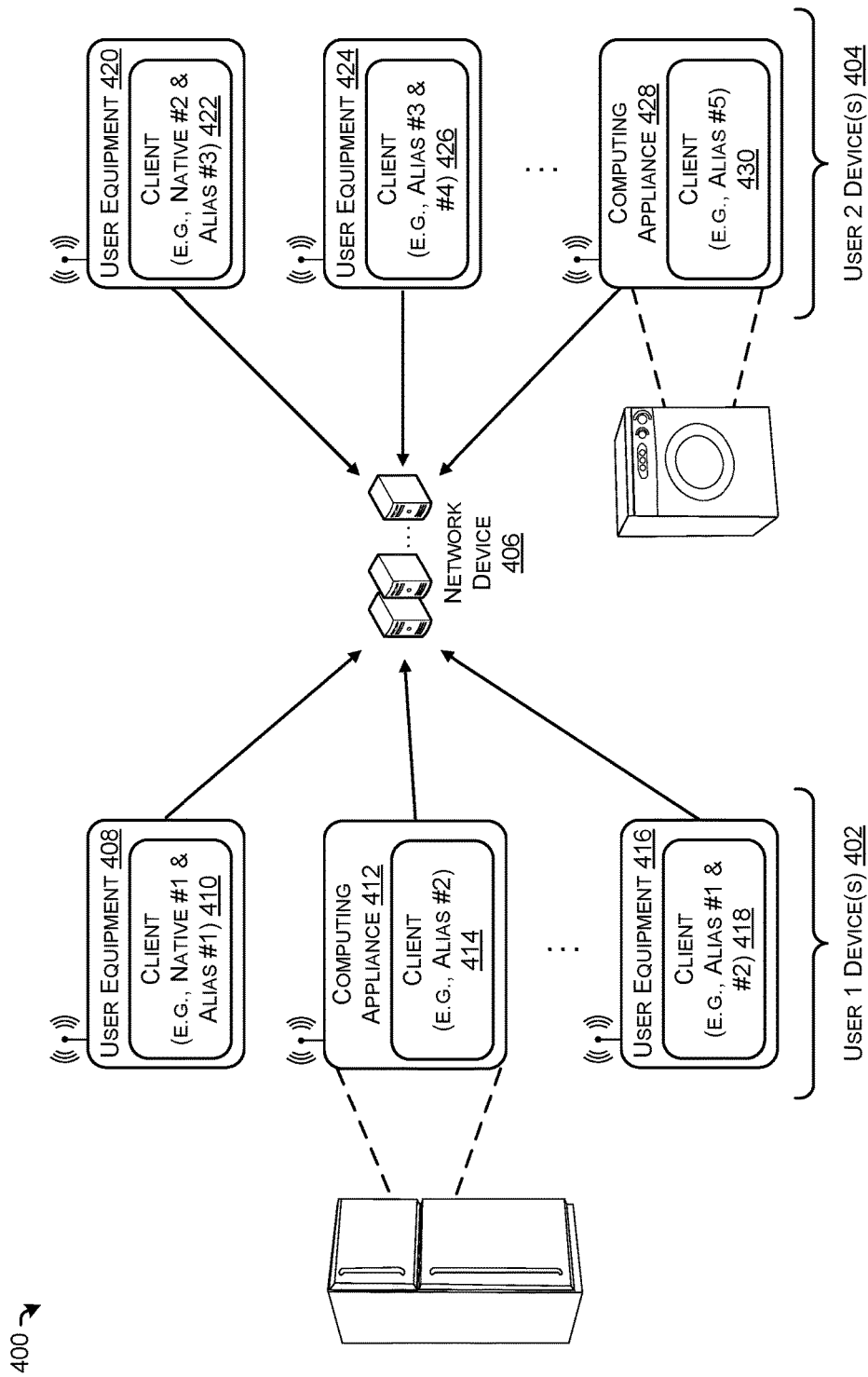
FIG. 4 illustrates an example environment including a plurality of user devices associated with a first user and a second user and implementing the network based personal number blocking, as discussed herein.

FIG. 4 illustrates an example environment 400 including a plurality of user devices associated with a first user and a second user and implementing the network based personal number blocking, as discussed herein. For example, the environment can include a plurality of devices associated with a first user (e.g., user 1 devices 402) and a plurality of devices associated with a second user (e.g., user 2 devices 404). The environment 400 can further include a network device 406 providing the network based personal number blocking, as discussed herein.

In some examples, the user 1 devices 402 can include user equipment 408 including a client 410, a computing appliance 412 including a client 414, and user equipment 416 including a client 418.

Further, in some examples, the user 2 devices 404 can include user equipment 420 including a client 422, user equipment 424 including a client 426, and a computing appliance 428 including a client 430. As can be understood, the user 1 devices 402 and the user 2 devices 404 can include any number and type of devices.

In some instances, the clients 410, 414, 418, 422, 426, and 430 can refer to a client application that can be downloaded and installed on the respective user equipment or computing appliances, and in some embodiments, the clients 410, 414, 418, 422, 426, and 430 can be installed by a manufacturer of the respective devices and activated by a user. In some embodiments, the clients 410, 414, 418, 422, 426, and 430 can enable communications at the respective devices via one or more alias number(s). In some embodiments, for example, user interaction with the client 410 on the user equipment 408 can enable the alias number(s) on the user equipment 408. In some embodiments, the alias number(s) can correspond to phone numbers that have been selected and enabled for association with the UE 408, and can correspond to phone numbers such as "555-222-1111", "555-222-2222", "555-222-5555". That is to say, the alias number(s) can overlap with some alias numbers associated with various UE and computing appliances in the environment 400, and can include alias numbers unique to the UE 408. In some embodiments, the alias number(s) can include Internet Protocol (IP) addresses, and or other identifiers to identify the UE or computing appliances via a network.

As discussed herein, and by way of example, the user 1 devices 402 can be selectively activated to block some or all of the communications from one or more of the user 2 devices 404. For example, the UE 408 can be associated with a native number and one or more alias numbers (e.g., native (number) 1 and alias (number 1)), as indicated by the client 410. In some instances, the network device 406 can receive one or more PNB indications associated with the UE 408 to block various numbers/devices associated with the user 2 devices 404.

In one example, the UE 408 can provide a PNB indication to the network device 406 that all devices/numbers associated with the user 2 devices 404 are to be blocked. In such a case, when a communication request is received from any of the UE 420 or 424, or from the computing appliance 428, the network device 406 can prevent signaling from reaching the user 1 devices 402.

In another example, the UE 408 can provide a PNB indication to the network device 406 that specific devices/numbers of the user 2 devices 404 are to be blocked from specific devices/numbers of the user 1 devices 402. For example, the PNB indication can specify that an alias (number) 3 is to be blocked from an alias number 2. Thus, in such an example, if the UE 424 using the alias (number) 3 were to transmit a communication request to alias (number) 2, no signaling would be provided to the user 1 devices 402. In another example, a PNB indication can specify that an alias number 3 is to be blocked from a UE 416. In this example, if the UE 424 using the alias (number) 3 were to transmit a communication request to alias (number) 2, no signaling would be provided to the UE 416, but signaling may be provided to the computing appliance 412 via the alias 2. As can be understood, these examples are illustrative, and the disclosure is not limited to the specific examples discussed herein. In general, a blocking user can specify particular user devices, numbers, and/or user profile that are to be blocked, and can specify particular terminating devices and/or number that may block incoming communications, for example, thereby providing a flexible framework for personal blocking, as discussed herein.

In some instances, the computing appliances 412 and 428 may represent any appliance with a client installed thereon (e.g., the client 414 and 430, respectively), and configured to communicate with the network device 406 via one or more alias number, for example. Thus, the computing appliances 412 and 428 can include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network. In some embodiments, the computing appliances 412 and 428 can be considered to be a part of the "Internet of Things," whereby appliances are enabled to collect and exchange data.

FIGS. 5-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
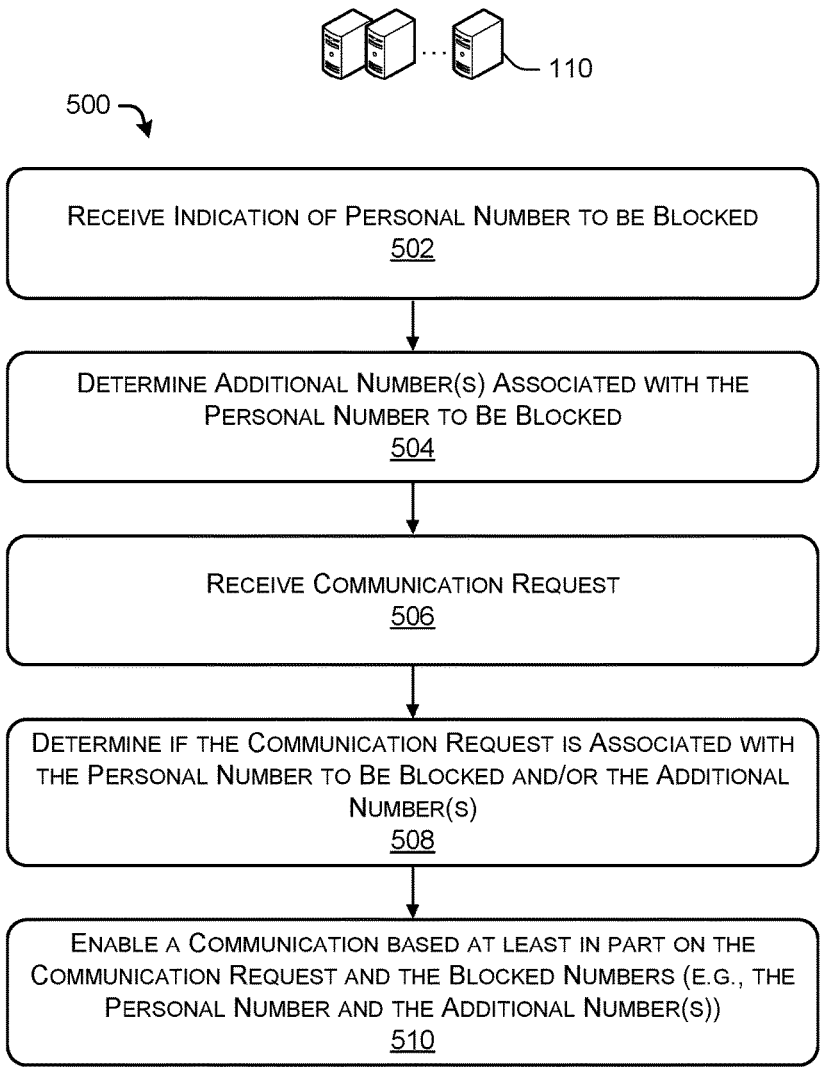
FIG. 5 illustrates an example process for network based personal number blocking.

FIG. 5 illustrates an example process 500 for network based personal number blocking. The example process 500 can be performed by the network device 110, 300, 406 (or another component), in connection with other components discussed herein. Some or all of the process 500 can be performed by one or more devices or components illustrated in FIGS. 1-4, for example.

At operation 502, the process can include receiving an indication of a personal number to be blocked. In some instances, the personal number to be blocked can be received from a user equipment, or can be received via a user interface interacting with a website, for example, providing an interface to receive one or more personal number blocking indications. In some instances, the indication of a personal number to be blocked (e.g., a PNB indication) can include an identification of one or more native numbers, one or more alias numbers, one or more user profiles, one or more user equipment or computing devices/appliances, one or more communication types, or the like. In some instances, the PNB indication can include instructions to associate an identified number with other number or communication methods to block all known instances for communication blocking.

At operation 504, the process can include determining additional number(s) associated with the personal number to be blocked. For example, the operation 504 can be based at least in part on receiving an indication to perform such associating operation, as discussed above. In some instances, the operation 504 can include accessing a database or a table storing relationships or associations between individual numbers (e.g., native numbers, alias numbers), email addresses, applications, user profiles, user devices, etc. Upon setting a preference to block communications from one number, the operation 504 can include setting preferences for associated numbers, as discussed herein.

At operation 506, the process can include receiving a communication request. In some instances, the communication request can be received from an originating device or an initiating device. In some instances, the communication request can be in any form in accordance with one or more signaling protocols (e.g., as defined under 3GPP). In some instances, the communication request can be directed to a voice call, a video call, an SMS/MMS message, etc.

At operation 508, the process can include determining if the communication request is associated with the personal number to be blocked and/or the additional number(s). For example, the operation 508 can include parsing the communication request to determine the originating address and the terminating address. Further, the operation 508 can include accessing a personal number blocking database to determine if the originating address (or any number associated with the originating address) is blocked from accessing the terminating address.

At operation 510, the process can include enabling a communication based at least in part on the communication request and the blocked numbers (e.g., the personal number and the additional number(s)). That is, if the originating number associated with the communication request is one of a blocked number or is associated with the blocked number, the operation 510 can include blocking the communication request from being fulfilled. If originating number associated with the communication request is not one or a blocked number or is not associated with the blocked number, the operation 510 can include establishing a communication session and/or transmitting the communication request to the terminating (e.g., destination) device.

Figure 6:
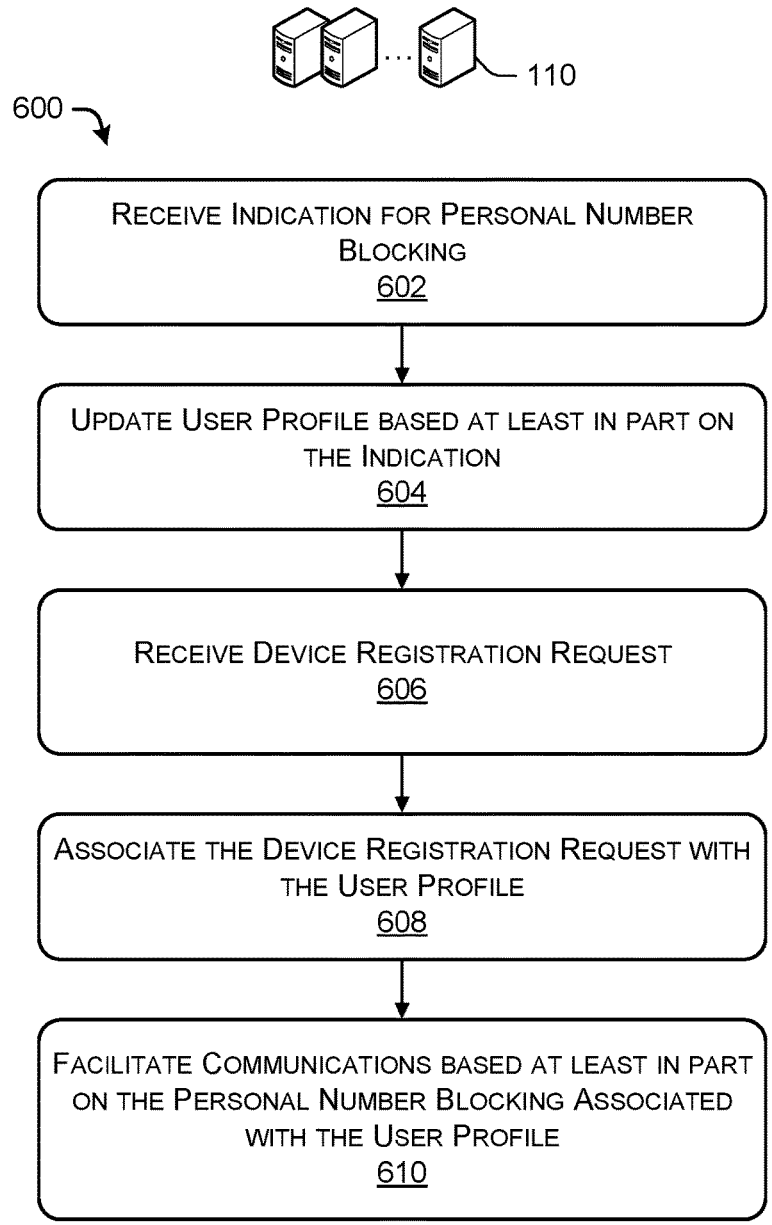
FIG. 6 illustrates an example process for applying the network based personal number blocking to devices based at least in part on a registration request.

FIG. 6 illustrates an example process 600 for applying the network based personal number blocking to devices based at least in part on a registration request. The example process 600 can be performed by the network device 110, 300, 406 (or another component), in connection with other components discussed herein. Some or all of the process 600 can be performed by one or more devices or components illustrated in FIGS. 1-4, for example.

At operation 602, the process can include receiving an indication for personal number blocking. For example, the operation 602 can include similar operations as discussed above in connection with the operation 502. In some instances, the operation 602 can include receiving one or more PNB indications from a UE, a computing appliance, and/or a computing device configured to receive preferences associated with personal number blocking and to transmit indications of such preferences (e.g., the PNB indication) to the network device, for example.

At operation 604, the process can include updating a user profile based at least in part on the indication. For example, the indication can include personal number blocking preferences to block or unblock particular number, user profiles, devices, etc. The operation 604 can include applying such blocking preference to the various numbers, as discussed herein.

At operation 606, the process can include receiving a device registration request. For example, the operation 606 can include receiving the device registration request and determining that the device associated with the registration request has not been registered with a network device. In some instances, the operation 606 can include determining that the device registration request is a request to associate a new alias number with a user profile, or to associate a previously used alias number with a new UE, computing appliance, or computing device.

At operation 608, the process can include associating the device registration request with the user profile. Thus, the operation 608 can enable the communications associated with the device to be handled in accordance with the user profile, thereby enabling the seamless integration of the personal number blocking for a new device, for example. In this manner, devices can be configured in accordance with the personal number blocking preferences stored or associated with the user profile, without having to reconfigure a device or duplicate efforts to set personal number blocking preferences each time a new device is added to a network or when a new alias number or previously used alias number is associated with a device.

At operation 610, the process can include facilitating communications based at least in part on the personal number blocking associated with the user profile. For example, a network device can receive communication requests and can determine if the originating device is a blocked device with respect to a terminating device, as discussed herein.

Figure 7:
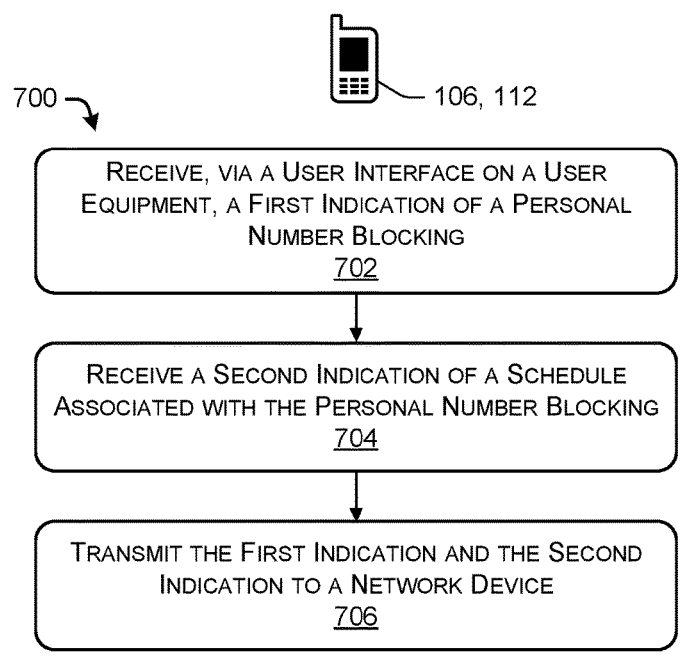
FIG. 7 illustrates an example process for scheduling the network based personal number blocking.

FIG. 7 illustrates an example process 700 for scheduling the network based personal number blocking. The example process 700 can be performed by the user equipment 106, 112, 200, 408, 416, 420, or 424, the computing appliances 412 or 428, or another device or component, in connection with other components discussed herein. Some or all of the process 700 can be performed by one or more devices or components illustrated in FIGS. 1-4, for example.

At operation 702, the process can include receiving, via a user interface on a user equipment, a first indication of a personal number blocking. For example, the operation 702 can include presenting a user interface on a display of a UE and receiving input regarding one or more preferences associated with a native number, an alias number, a user device, a user profile, etc. In some instances, the operation 702 can be performed using a user interface presented in connection with a network device, and is not limited to receiving input via a UE.

At operation 704, the process can include receiving a second indication of a schedule associated with the personal number blocking. For example, the operation 704 can include presenting a user interface via the UE or another computing device and receiving an indication of dates and/or times whereby personal number blocking is to be applied (or conversely, when the PNB is not to be applied). Further, in some examples, the operation 704 can include receiving one or more geographical indications, so that the PNB can be based at least in part on a location of the blocking UE.

At operation 706, the process can include transmitting the first indication and the second indication to a network device. In some examples, the network device can receive the first indication and the second indication and can update a user profile or database to reflect the PNB preferences, as discussed herein. Further, the operation 706 can include facilitating communications based at least in part on the first indication and the second indication.

Figure 8:
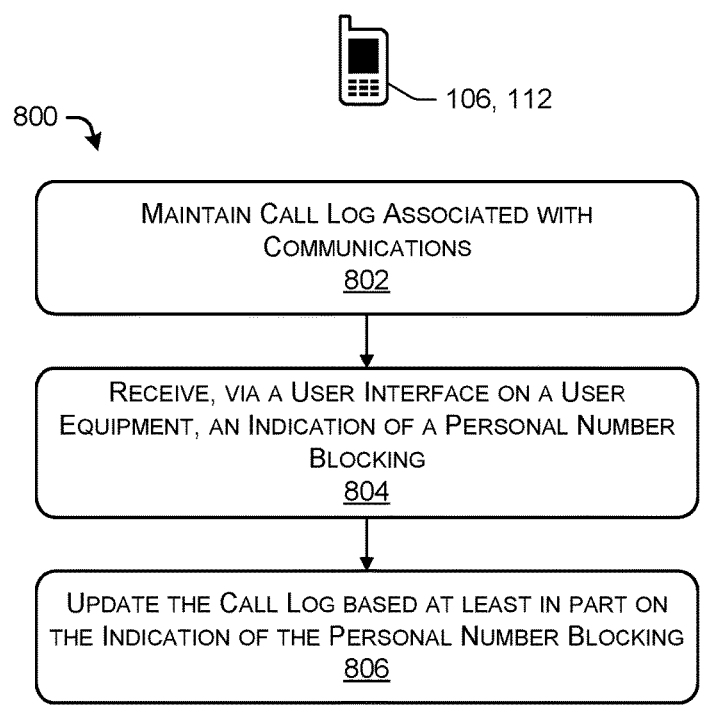
FIG. 8 illustrates an example process for updating a call log based at least in part on the personal number blocking.

FIG. 8 illustrates an example process 800 for updating a call log based at least in part on the personal number blocking. The example process 800 can be performed by the user equipment 106, 112, 200, 408, 416, 420, or 424, the computing appliances 412 or 428, or another device or component, in connection with other components discussed herein. Some or all of the process 800 can be performed by one or more devices or components illustrated in FIGS. 1-4, for example.

At operation 802, the process can include maintaining a call log associated with communications. In some instances, the call log can be maintained at a user equipment in connection with initiating and/or receiving communications (e.g., calls, video chat, SMS/MMS, etc.). In some instances, the call log can be maintained on a network device and/or be accessible via a remote computing device. As can be understood, the call log can maintain details of communications such as a date of the communication, time of starting/concluding the communication, a length of time associated with the communication, one or more identifiers associated with the communication, a content of the communication (e.g., for an SMS/MMS), etc.

At operation 804, the process can include receiving, via a user interface on a user equipment, an indication of a personal number blocking. In some examples, the indication of the personal number blocking can include an identification of one or more native numbers, one or more alias number, one or more user profiles, one or more user equipment or computing devices, and the like, to be blocked. In some instances, the operation 804 can be performed in connection with a website or application accessible via a computing device that is remote to the user equipment.

At operation 806, the process can include updating the call log based at least in part on the indication of the personal number blocking. For example, prior to receiving the PNB indication, the call log can present specific details associated with various communications, such as the native/alias number of the other party, identifiers of the other party, etc. In some instances, at least partly in response to receiving the PNB indication, the call log can be updated to remove details associated with a communication and/or to remove the communications from the call log. For example, the operation 806 can change a call log entry from "Incoming call from John Doe at 555-555-5555" to "Blocked Call". In another example, the operation 806 can completely remove the call log entry from the call log. In some instances, the operation to change or remove the blocked entries from the call log can be based at least in part on a user selectable preference or setting.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
one or more processors;
a memory; and
one or more components stored in the memory and executable by the one or more processors to perform operations comprising:
receiving, from a first user equipment, an indication of at least one personal number to be blocked, the at least one personal number to be blocked associated with a second user equipment;

updating, based at least in part on the indication, one or more personal number blocking preferences in a user profile associated with the first user equipment, the user profile stored in a network device that is remote from the first user equipment;

receiving, from the second user equipment, a first communication request directed to the first user equipment;

determining, based at least in part on the one or more personal number blocking preferences, that the first communication request is associated with the at least one personal number to be blocked;

refraining from signaling the first user equipment based at least in part on determining that the first communication request is associated with the at least one personal number to be blocked;

determining at least one alias phone number associated with the at least one personal number to be blocked; and updating, based at least in part on the at least one alias phone number being associated with the at least one personal number to be blocked, the one or more personal number blocking preferences indicating that the at least one alias phone number is to be blocked from signaling the first user equipment upon reception of a second communication request, the second communication request originating from the at least one alias phone number and directed to the first user equipment.

2. The system of claim 1, wherein the user profile is a first user profile, and wherein the at least one alias phone number is one of a plurality of alias phone numbers associated with a second user profile associated with the second user equipment.

3. The system of claim 1, wherein the operations further comprise:
  determining that a further alias phone number is associated with the first user equipment;
  determining that the further alias phone number is associated with a native phone number associated with the first user equipment; and
  refraining from signaling the first user equipment upon reception of a third communication request originating from the at least one personal number to be blocked and directed to the further alias phone number.

4. The system of claim 1, wherein the operations further comprise updating a call log associated with the user profile based at least in part on receiving the indication of the at least one personal number to be blocked.

5. A system comprising:
  one or more processors;
  a memory; and
  one or more components stored in the memory and executable by the one or more processors to perform operations comprising:
    receiving a personal number blocking indication of a personal number blocking preference with respect to a first user equipment and a second user equipment;
    updating a user profile stored on a network device based at least in part on the personal number blocking preference;
    receiving a communication request to initiate a mobile communication between the first user equipment and the second user equipment; and
    refraining from signaling the first user equipment based at least in part on the personal number blocking preference;
    receiving a registration request from a computing appliance to enable communications associated with an alias phone number via the computing appliance;
    determining that the alias phone number is associated with the user profile;
    determining that the alias phone number is associated with the personal number blocking preference; and
    refraining from signaling the computing appliance based at least in part on the personal number blocking preference.

6. The system of claim 5, wherein the personal number blocking indication is received at the network device from the first user equipment or a user interface configured to receive updates to the user profile.

7. The system of claim 5, wherein the user profile is a first user profile, and wherein the operations further comprise:
  determining that the personal number blocking preference includes instructions to block communications originating from a native phone number associated with the second user equipment or an alias phone number associated with a second user profile associated with the second user equipment.

8. The system of claim 5, wherein no communication signals are transmitted to the first user equipment in response to the communication request and based at least in part on the personal number blocking preference.

9. The system of claim 5, wherein the operations further comprise:
  determining that the personal number blocking preference is associated with a native number associated with the first user equipment and the alias phone number associated with the first user equipment and the computing appliance.

10. The system of claim 5, wherein the operations further comprise:
  determining that the personal number blocking preference indicates a schedule indicating a time period when to block communications originating from the second user equipment and that are directed to the first user equipment.

11. The system of claim 5, wherein the communication request is a first communication request, and wherein the operations further comprise:
  determining that the personal number blocking preference indicates that a second communication request originating from the second user equipment and directed to the first user equipment and associated with a first communication type is to be blocked from signaling the first user equipment; and
  determining that the personal number blocking preference indicates that a third communication request originating from the second user equipment and directed to the first user equipment and associated with a second communication type is to be allowed to signal the first user equipment.

12. The system of claim 5, wherein the operations further comprise updating a call log associated with the user profile based at least in part on the personal number blocking preference.

13. A processor-implemented method comprising:
  receiving a personal number blocking indication of a personal number blocking preference with respect to a first user equipment and a second user equipment;
  updating a user profile stored on a network device based at least in part on the personal number blocking preference;

receiving a communication request to initiate a mobile communication between the first user equipment and the second user equipment; and refraining from signaling the first user equipment based at least in part on the personal number blocking preference;

receiving a registration request from a computing appliance to enable communications associated with an alias phone number via the computing appliance;

determining that the alias phone number is associated with the user profile;

determining that the alias phone number is associated with the personal number blocking preference; and refraining from signaling the computing appliance based at least in part on the personal number blocking preference.

14. The processor-implemented method of claim 13, wherein the user profile is a first user profile, and wherein the processor-implemented method further comprises:

determining that the personal number blocking preference includes instructions to block communications originating from a native phone number associated with the second user equipment or an alias phone number associated with a second user profile associated with the second user equipment.

15. The processor-implemented method of claim 13, wherein the processor-implemented method further comprises:

determining that the personal number blocking preference is associated with a native number associated with the first user equipment and the alias phone number associated with the first user equipment and the computing appliance.

16. The processor-implemented method of claim 13, wherein the processor-implemented method further comprises:

determining that the personal number blocking preference indicates a schedule indicating a time period when to block communications originating from the second user equipment and that are directed to the first user equipment.

17. The processor-implemented method of claim 13, wherein the communication request is a first communication request, and wherein the processor-implemented method further comprises:

determining that the personal number blocking preference indicates that a second communication request originating from the second user equipment and directed to the first user equipment and associated with a first communication type is to be blocked from signaling the first user equipment; and determining that the personal number blocking preference indicates that a third communication request originating from the second user equipment and directed to the first user equipment and associated with a second communication type is to be allowed to signal the first user equipment.

\* \* \* \* \*